United States Patent
Sprenger et al.

(10) Patent No.: US 7,291,571 B2
(45) Date of Patent: Nov. 6, 2007

(54) CRYSTALLIZABLE GLASS AND THE USE THEREOF FOR PRODUCING EXTREMELY SOLID AND BREAK RESISTANT GLASS-CERAMICS HAVING AN EASILY POLISHED SURFACE

(75) Inventors: Dirk Sprenger, Stadecken-Elsheim (DE); Thilo Zachau, Buerstadt-Riedrode (DE); Rainer Liebald, Nauheim (DE)

(73) Assignee: Schott AG, Mainz (DE)

( * ) Notice: Subject to any disclaimer, the term of this patent is extended or adjusted under 35 U.S.C. 154(b) by 9 days.

(21) Appl. No.: 10/528,718

(22) PCT Filed: Sep. 26, 2003

(86) PCT No.: PCT/DE03/03227

§ 371 (c)(1),
(2), (4) Date: Sep. 2, 2005

(87) PCT Pub. No.: WO2004/031089

PCT Pub. Date: Apr. 15, 2004

(65) Prior Publication Data

US 2006/0166804 A1    Jul. 27, 2006

(30) Foreign Application Priority Data

Sep. 27, 2002  (DE) ............... 102 45 234

(51) Int. Cl.
*C03C 10/08*  (2006.01)
*C03C 10/02*  (2006.01)
*C03C 3/062*  (2006.01)

(52) U.S. Cl. .............. 501/9; 501/10; 501/73; 501/77; 501/78; 428/846.9; 65/33.7

(58) Field of Classification Search ............ 501/9, 501/10, 73, 77, 78; 428/846.9; 65/33.7
See application file for complete search history.

(56) References Cited

U.S. PATENT DOCUMENTS

| | | | |
|---|---|---|---|
| 2,920,971 A | 1/1960 | Stookey | |
| 5,726,108 A | 3/1998 | Taguchi et al. | |
| 6,376,402 B1 * | 4/2002 | Pannhorst et al. | ............ 501/66 |

FOREIGN PATENT DOCUMENTS

| | | |
|---|---|---|
| EP | 0 289 903 B1 | 11/1988 |
| EP | 0 552 377 A1 | 7/1993 |
| EP | 0 755 901 A2 | 1/1997 |
| EP | 0 858 974 A1 | 8/1998 |
| EP | 0 941 973 | 9/1999 |
| EP | 1 067 101 A2 | 1/2001 |
| EP | 1 067 102 A2 | 1/2001 |
| JP | 03-131546 | 6/1991 |
| JP | 3-45027 * | 7/1991 |
| JP | 04-106806 | 4/1992 |
| JP | 11-079785 | 3/1999 |
| JP | 200327365 A | 11/2000 |

OTHER PUBLICATIONS

P. W. McMillen: "Glass Ceramics", Academic Press, London, NY, San Francisco, 2. Auflage, 1979, pp. 18-43 (Reference is in English).
A.G. Evans et al, Journal of the American Ceramic Society 59, 1976, p. 371-372.

* cited by examiner

*Primary Examiner*—Karl Group
(74) *Attorney, Agent, or Firm*—Michael J. Striker

(57) ABSTRACT

The invention relates to crystallizable aluminosilicate magnesium-containing glass which is used for producing extremely solid and break-resistant glass-ceramics having an easily polished surface. The inventive crystallizable glass contains 5-33 mass % of $SiO_2$, 25-40 mass % of $Al_2O_3$, 5-25 mass % of MgO, 0-15 mass % of $B_2O_3$, 0.1-30 mass % of $Y_2O_3$, $Ln_2O_3$, $As_2O_3$ and/or $Nb_2O_5$ and 0.1-10 mass % of $P_2O_5$.

25 Claims, 1 Drawing Sheet

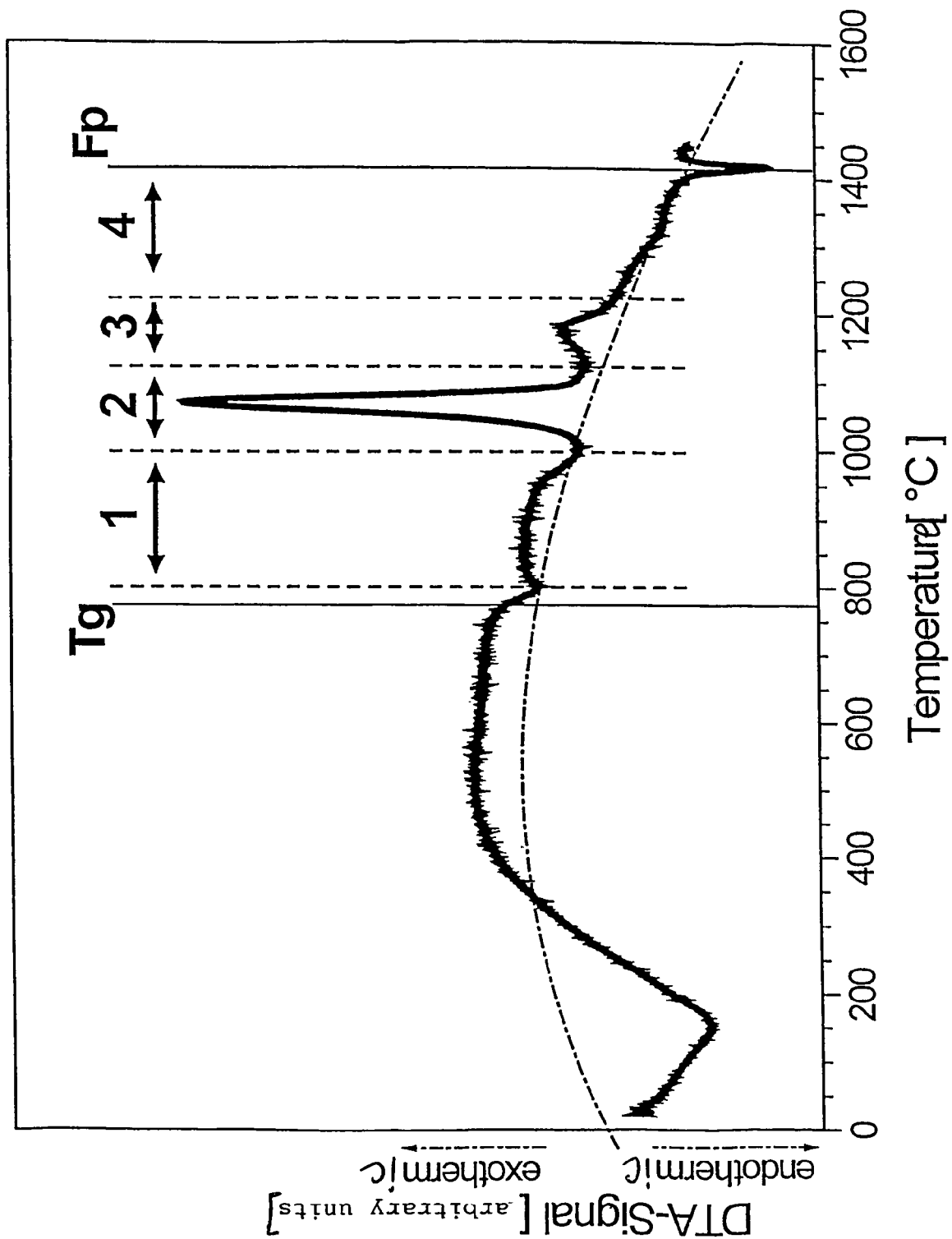

CRYSTALLIZABLE GLASS AND THE USE THEREOF FOR PRODUCING EXTREMELY SOLID AND BREAK RESISTANT GLASS-CERAMICS HAVING AN EASILY POLISHED SURFACE

The invention relates to a highly rigid, break-resistant, crystallizable glass of the magnesium-containing aluminosilicate type and to glass ceramics produced therefrom and having an easily polished surface, and to the use thereof in magnetic storage disks and mirror systems or as a substrate therefor.

Strict requirements in terms of breaking resistance, high specific rigidity and high surface quality are placed on magnetic storage disks and magneto-optical storage materials as well as on purely optical storage materials. The rising requirements in terms of storage density and access velocity placed on, for example, hard disk drives result in higher mechanical loads on the substrate materials. To bring about a definite reduction in access time, the rotation speed of the storage disk must be increased to more than 15,000 rpm and, in addition, the distance of the reading head from the disk surface must be further reduced. To make this possible, carrier materials are needed that have a high breaking resistance (Klc and flexural strength) and a very high modulus of elasticity or a very high specific rigidity and thus a low flutter amplitude. Moreover, it is absolutely necessary that the material have a very low surface roughness of Ra <0.5 nm at a waviness of <10 nm (ISO 1305 or DIN 4768). In addition, during preparation of a magnetic coating, the substrate or carrier material must withstand thermal loads in the range of about 400-450° C. and, because of pronounced temperature changes such as those occurring, for example, in sputter processes, must be resistant to temperature change. Finally, the thermal expansion of the storage materials and mirrors must be adapted to the recording device (spindles and spacers). These are currently made of steel so that a thermal expansion coefficient $\alpha_{20\text{-}300}$ of about 12 ppm/K is optimal, although lower values are also tolerable.

Currently used substrates for magnetic storage disks are made of aluminum alloys, glasses and glass ceramics. Although glasses have a higher modulus of elasticity, they have the drawback of a low Klc value. By thermal or chemical hardening, this value can be improved but only to a limited extent.

Because of their heterogeneous structure resulting from microcrystals embedded in a glass matrix, glass ceramics cannot be polished as well as glass itself or aluminum. Until now, glass ceramics therefore have only rarely reached the required surface roughness values of Ra <0.5 nm. This is due to the crystallites located near the surface which are generally harder than the glass phase that surrounds them. During the polishing steps therefore, more material is removed from the glass than from the crystallites resulting in a rough surface. For many applications, such materials are therefore unsuitable.

Glass ceramics, also known as vitroceramics, are polycrystalline solids prepared by selective devitrification, namely by crystallization from glasses that are particularly well suited for this purpose. This crystallization or ceramization is achieved by heating the glass objects or optionally by irradiation. As a result, however, the glass ceramic materials still contain a residual amount of a glass-phase matrix in which the crystals are embedded. Because by conventional glass-shaping techniques any desired shape can be imparted to glass ceramics in their initial glassy stage and because glass ceramics have many desirable properties such as resistance to temperature variation, low expansion coefficient and good electric insulation, they are suitable for the fabrication of many objects, for example hobs, cooking utensils, high-tension insulators, laboratory equipment and bone replacements or for sealing off environmental pollutants, for example spent nuclear fuel rods.

A well researched system for making glass or glass ceramics is the three-component $SiO_2$—$Al_2O_3$—$MgO$ system (MAS system). This three-component system has several composition regions wherein there exist or are stable or form differently specific crystalline phases. Until now, the descriptions of glass ceramics in the literature were limited to those regions of the MAS system in which the crystal phases quartz ($SiO_2$), tridymite ($SiO_2$), enstatite ($MgO\cdot SiO_2$), cordierite ($2\,MgO\cdot 2\,Al_2O_3\cdot 5\,SiO_2$), forsterite ($MgO\cdot SiO_2$), mullite ($3\,Al_2O_3\cdot 2\,SiO_2$) and possibly spinel ($MgO\cdot Al_2O_3$) exist as the thermodynamically most stable phases and thus could be referred to as the main crystalline phase.

The relatively narrow region in which stable glasses are known to exist have repeatedly been described in the literature, for example in P. W. McMillen: "Glass Ceramics", Academic Press, London, NY, San Francisco, 2nd ed. (1979), pages 18 ff. There it is also stated that $TiO_2$, $ZrO_2$ and $P_2O_5$ can be used as nucleation agents for the conversion of glasses of the MAS system into glass ceramics.

U.S. Pat. No. 2,920,971 (to Stookey et al.) describes aluminosilicate glasses containing titanium oxide and magnesium oxide. In this case, thermal post-treatment brings about the precipitation of cordierite as the crystalline magnesium aluminum silicate phase.

EP-A-0 289 903 describes a glass-coated/ceramic-coated substrate composition of the afore-said three-component system which contains 42-68 wt. % of $SiO_2$.

JA-91045027 B (to Nishigaki, J., et al.), JA-91131546 A (to Tanabe, N., et al.), JA-92106806 A (to Okubo, F., et al.) and EP 55 237 7 (to Kawamura et al.) describe different glass or glass ceramic compositions. These compositions, however, contain no crystalline magnesium aluminum silicate phases or they have a $SiO_2$ content of less than 33 wt. %.

EP-A-1 067 101, EP-A-1 067 102 and EP-A-0 941 973 describe yttrium-containing MAS glass ceramics as substrates for storage media. In these documents it is stated that the addition of 0.8-10 mol % of yttrium oxide to a basic glass mixture consisting of 35-65 mol % of $SiO_2$, 5-25 mol % of $Al_2O_3$, 10-40 mol % of MgO and 5-12 mol % of $TiO_2$ causes these glasses to melt more readily, to exhibit good mechanical properties and, after heat treatment, to give a glass ceramic with a modulus of elasticity of >130 GPa. These ceramics contain as crystalline phases mixed crystals of high quartz of varying composition, for example $MgO:Al_2O_3:SiO_2=2:2:5$ or 1:1:3 or 1:1:4 or mixtures, as well as enstatite ($MgO\cdot Al_2O_3$ or $MgO\cdot 0.5\,Al_2O_3\cdot SiO_2$). The nucleation agent used here is $TiO_2$ which, moreover, within limits compensates for a loss of transparency. $Y_2O_3$ is used as an additive to reduce the processing temperature. A $Y_2O_3$ content of >10 mol %, however, is undesirable, because it causes a marked increase in the tendency of the glass to crystallize.

The until now common glass ceramics usually contain as the main crystalline phases enstatite, forsterite and cordierite. Spinel and sapphirine phases are referred to as secondary phases. Here the lower limit of the $SiO_2$ content is 35 wt. %, lower limits of 40 or 42-44 wt. % being common. Until now it has been assumed that, no industrially processable glasses can be prepared below this $SiO_2$ concentration.

JP-A-2000-327365 refers to 25 wt. % of $SiO_2$ as the lower limit for alkali-containing glasses, and JP-A-11079785 to 30 wt. % for alkali-free glasses.

The object of the invention is to provide novel glasses that have a low $SiO_2$ content but are still industrially processable and that can be converted into glass ceramics having a high modulus of elasticity.

Another object of the invention is to provide glass ceramics that can be polished to the desired surface roughness and that can be used as substrates for magnetic storage disks or mirror systems. This objective is reached by means of the glass defined in the claims and of glass ceramics that can be obtained therefrom, as well as by the use thereof.

Surprisingly, we have now found that it is possible to produce glasses and glass ceramics containing a small amount of network-forming $SiO_2$ below the afore-indicated range of >30 wt. % and which when $Y_2O_3$, $Nb_2O_5$ and/or $Ln_2O_3$ is added to this glass are also suitable for industrial processing. In this regard, we have found, surprisingly, that such a glass is not only highly rigid and break-resistant, but that even before the selective nucleation or ceramization it is stable in terms of the formation of crystalline phases, namely that it can be cooled for annealing purposes. Moreover, such a glass ceramic can be polished to the desired surface roughness of Ra <0.5 nm.

The glass of the invention or the glass ceramic obtained therefrom is formed from the "$SiO_2$—MgO—$Al_2O_3$" three-component system and additionally contains some $B_2O_3$. The minimum amount of $SiO_2$ is 5 wt. % and particularly 10 wt. %, with 15 wt. % being especially preferred. The upper limit is usually 33 wt. % or 30 wt. %, with 28 wt. % and particularly 25 wt. % being preferred.

The minimum amount of MgO is 5 wt. %, preferably 8 wt. %, with 10 wt. % being particularly preferred. The upper limit of MgO lies at 25 wt. %, with 20 wt. % being preferred. The $Al_2O_3$ content is at least 25 wt. % and preferably at least 30 wt. %. The maximum content of $Al_2O_3$ is 40 wt. % and preferably 38 wt. %. Boron oxide does not necessarily have to be present, but the $B_2O_3$ content is in many cases at least 1 wt. %, usually at least 2 wt. % and preferably at least 3 wt. %, the upper limit of $B_2O_3$ in the composition of the invention being at the most 15 wt. %, usually at the most 12 wt. % and preferably at the most 10 wt. % or at the most 9 wt. %.

The oxides of the group consisting of $Y_2O_3$, $Ln_2O_3$ and $Nb_2O_5$ are present in the composition of the invention in an amount of at least 0.1 wt. %, usually at least 3 wt. % and preferably at least 12 wt. %. The upper limit for these oxides is 30 wt. % and preferably 28 wt. %, an upper limit of 25 wt. % being particularly preferred. The amounts of the individual oxides are usually 0.1-30 wt. %, preferably 10-30 wt. %, for $Y_2O_3$ and 0-20 wt. % for $Ln_2O_3$. Ln comprises the lanthanoids, particularly La, Ce, Pr, Nd, Eu, Yb, Ho and Er. The composition of the invention can contain as additional components the common refining agents and fluxes such as $Sb_2O_3$, $As_2O_3$ or $SnO_2$ in amounts commonly used for these purposes. The upper limit for each of $Sb_2O_3$ and $As_2O_3$ is 5% maximum and preferably 2% maximum.

In a preferred embodiment, the glass or glass ceramic of the invention contains 0-12 wt. % of $TiO_2$, 0-10 wt. % of $ZrO_2$, 0-5 wt. % of CaO, 0-5 wt. % of SrO, 0-5 wt. % of BaO and 0-20 wt. % of ZnO. In an embodiment preferred according to the invention, the composition contains at least 2 wt. % and preferably at least 4 wt. % of $TiO_2$ and a maximum amount of preferably at the most 12 wt. % and particularly at the most 10 wt. %. To the extent that the other oxides are at all present, the minimum amount of said other oxides, namely $ZrO_2$ and ZnO, is usually 1 or 2 wt. % and the maximum amount at the most 5 or 8 wt. %, each.

The glass of the invention or the glass ceramic of the invention is preferably essentially free of alkali metal oxides such as $Li_2O$, $Na_2O$ and $K_2O$ and contains them only as impurities introduced with the other compositions of the mixture. By "essentially alkali-free" is meant an amount of at the most 2 wt. %, an amount of at the most 0.5 wt. % being common.

We have found that the glass or glass ceramic of the invention can contain up to 10 wt. % and usually <5 wt. % of transition metal oxides without this causing a significant change in the resulting properties such as rigidity, breaking strength and crystallization charateristics. The usual transition metal oxides present in the glass or glass ceramic of the invention comprise the oxides of the elements Fe, Co, Ni, Cr, Mn, Mo, V, Pt, Pd, Rh, Ru and W and are in particular $MnO_2$, $Fe_2O_3$, NiO, CoO, $Cr_2O_3$, $V_2O_5$, $MoO_3$ and/or $WO_3$. In an embodiment preferred according to the invention, the sum of the components SrO, BaO and CaO is at least 1 wt. %, preferably at least 2 wt. %, usually at the most 5 wt. % and particularly at the most 4 wt. %. If present, the oxides $TiO_2$ and $ZrO_2$ are present in an embodiment preferred according to the invention in an amount of at least 1 wt. %, preferably at least 2 wt. %, more preferably at the most 13 wt. % and particularly at the most 10 wt. %.

The glass of the invention or the glass ceramic of the invention has a high modulus of elasticity of at least >110 GPa. Usually, the modulus of elasticity is above 120 GPa. Depending on the ceramization program, it is possible to prepare glass ceramics with a modulus of elasticity greater than 150 GPa, and in some cases even >200 GPa. (Determination of the modulus of elasticity in accordance with DIN EN 843-2, item 4, method A: static flexing method).

In the glass ceramic of the invention, the crystallites are embedded in a glassy matrix and their size is usually, but not necessarily, from <100 nm to about 3 μm. For good polishability of the glass ceramics, crystallite sizes in the range of 50-500 nm are particularly preferred. We have found that crystallization of a glass composition according to the invention gives a glass ceramic containing as its main crystal phases spinel, sapphirine and/or cordierite. In this respect, we have surprisingly also found that the desired properties of the glass ceramic are obtained especially when the crystal phases usually associated with high values of the modulus of elasticity, namely enstatite, high quartz or low quartz or mixed crystals of high quartz, are avoided, which is possible particularly with the composition of the invention. Moreover, the glass ceramics obtained according to the invention can contain crystals with a structure of pyrochlore, $A_2B_2O_7$, wherein $A^{3+}$ denotes a lantanoid and/or yttrium and $B^{4+}$ denotes Zr, Ti, Sn and/or Ru. Moreover, they can contain pyrosilicates having the general formula $A_2Si_2O_7$ wherein $A^{+3}$ denotes a lantanoid, Y and/or Sc. Preferably, however, they are $Y_2Si_2O_7$ (yttrium pyrosilicate, yttrialite) or $Y_2Ti_2O_7$ (yttropyrochlore).

According to the invention, we have also found that the order in which the crystal phases precipitate has a decisive influence on the modulus of elasticity. We found that after the primary precipitation of small spinel crystallites and possibly of small sapphirine crystallites, particularly those of the $Mg_2Al_4SiO_{10}$ type, the subsequent secondary crystal phases of the sapphirine and cordierite type are formed around the primary crystallites, particularly as a coating over the primary crystallites. According to the invention, we have found that the $SiO_2$ content and the crystal structure of the secondarily precipitated phase depend on the silicon and yttrium content of the base glass, a low $SiO_2$ content of the base glass promoting the formation of sapphirine. By the selection of the kind and amount of nucleating agents ($TiO_2$, $ZrO_2$, $P_2O_5$), the size of the crystallites of the primary crystals or of the nuclei can be selectively controlled. The size of the crystallites of the secondary phases can be controlled kinetically or thermodynamically (utilization of diffusion and epitaxy phenomena). Present as tertiary crystal phases are pyrochlores, pyrosilicates, xenotimes and/or rutile. By their precipitation, it is possible to influence the amount of residual glass phase and thus also the modulus of elasticity of the resulting glass ceramic. According to the invention, we have also found that in the glass ceramic of the invention $TiO_2$ not only acts as a nucleating agent, but it also becomes incorporated into the crystal phases with a high modulus of elasticity. Surprisingly, we have also found that in the procedure according to the invention refining agents such as $SnO_2$ and $As_2O_3$ become integrated into the spinel or pyrochlore phases. According to the invention, it is possible in this manner to reduce the amount of residual glass phases even further and at the same time to cause selectively the precipitation of crystallites with a high modulus of elasticity.

Because the described melts are practically alkali-free, corrosion of the magnetic or magneto-optical or optical layer applied to the storage substrate as a result of alkali diffusion is also not possible.

According to the invention, we have also found that with the glass of the invention a glassy layer is formed on the surface of the glass ceramic object during ceramization, the thickness of said layer being markedly greater than that of the amount of residual glass remaining in-between the crystallites. As a result of this glassy layer, semifinished products for storage substrates have a very low surface roughness. Because this glass phase can be polished better than the precipitated crystals, the expense for subsequent processing is markedly reduced.

In addition, the glass of the invention or the glass ceramic of the invention has very good mechanical properties such as a high flexural strength of >150 MPa (determined as 3-point flexural strength in accordance with DIN EN 843-1) and particularly >180 MPa, and a Klc of 1.3 $MPam^{1/2}$ [determined by the method of A. G. Evans, E. A. Charles, J. Amer. Ceram. Soc. 59 (1976), 371].

The glasses according to the invention are converted to the corresponding glass ceramics by heat treatment at a temperature above the Tg. To this end, the conversion temperature and the formation of the crystal phases are determined by known methods, for example with the aid of a holding curve obtained by differential thermal analysis (DTA).

To convert the glass into a glass ceramic, the glass is heated at the conversion temperature until the crystalline phases have precipitated. The glasses are usually heated at a temperature of about 5-50° C. above the Tg, and preferably 10-30° C. above the Tg, until the primary crystallites have formed in sufficient quantity. The glass transition temperature of these glasses is usually 700-850° C.

The holding time for the formation of the primary crystallites or crystal nuclei depends on the desired properties and usually amounts to at least 0.5 hour, preferably at least 1 hour, a length of time of 1.5 hours being particularly preferred. The maximum time is usually considered to be 3 days, but 2 days and particularly 1 day are preferred as the maximum time for forming the primary crystal nuclei. In most cases, a 2-12 hour period is sufficient. The material is then heated to a higher temperature at which the main crystal phases precipitate.

This temperature is usually at least 20° C., and preferably at least 50° C., above the temperature of formation of the primary crystallites. In special cases, it was found to be advantageous, after the precipitation of the main crystal phases (secondary crystals), particularly of spinel, sapphirine and/or cordierite, to heat the material once again to another higher temperature to cause the precipitation, from the residual glass phase remaining in between the primary and/or secondary crystals, of other crystal phases, for example of pyrochlores, pyrosilicates, xenotimes and/or rutile as well as of mixture thereof.

The glass ceramic of the invention has a thermal expansion coefficient (TEC) $\alpha_{20\text{-}600}$ of $4\text{-}9\times10^{-6}$ $K^{-1}$ (determined in accordance with DIN-ISO 7991).

The glass according to the invention is particularly well suited for the fabrication of magnetic storage disks, magneto-optical memory devices, mirror carriers or substrates therefor.

In the following, the invention will be described in greater detail.

FIG. 1 shows the results of a study of the glass of the invention by differential thermal analysis (DTA curve for exemplary embodiment No. 1)

To obtain the temperature—time program for the conversion according to the invention of the base glass into a glass ceramic, the formation temperatures of the individual crystal phases were estimated. This was done with the aid of differential thermal analysis. In this manner, a curve was obtained (see FIG. 1) in which the exothermic reactions are indicated as a peak (maximum) or the endothermic reactions as a dip (minimum) relative to a standard curve (dash-dot line). Crystallization reactions are generally exothermic; changes in structure or in the state of aggregation are usually endothermic.

For the glasses of the invention, a first minimum was obtained in the temperature range of >700° C. and often above 740° C. The point of inflection for the DTA curve descending toward this minimum indicates the transition temperature of the glass, Tg (in FIG. 1: about 780° C.).

The flat maximum in the temperature range marked 1 reflects the temperature range of nucleation or of precipitation of primary crystal phases. In the case of the glasses/glass ceramics of the invention, in this range takes place the precipitation of nuclei or very small spinel crystallites that cannot be characterized more closely by analysis of the crystal structure (crystallite volume <150 $nm^3$).

The temperature range marked 2 contains a clearly defined peak. This indicates the exothermic crystallization reaction of secondary crystal phases to primary nuclei.

In temperature range 3, exothermic reactions are also indicated by diverse peaks attributable to the crystallization of tertiary crystal phases.

In peak-free or dip-free temperature interval 4 a ripening, growth or possibly intrinsic recrystallization of the precipitated phases takes place. Such processes, however, are also possible in the entire temperature range>Tg, and thus also in temperature intervals 1, 2 and 3.

A sharp dip (in FIG. 1: about 1415° C.) marked with Fp identifies the melting point of the glass ceramic.

To prepare the glass ceramics of the invention, the nuclei or primary crystallites were preferably formed at a temperature below two thirds of the temperature interval 1, it being preferred to select a temperature within the lower half. Even more preferred is the selection of a temperature in the lower third of this range marked 1. At the end of a sufficiently long holding time, or after the formation of a sufficiently large number of primary crystallites or nuclei, the material was heated to a higher temperature at which the main crystal phases of the glass ceramic material precipitate or the primary crystallites show considerable growth. Such a temperature usually lies in the temperature interval marked 2 and is at least 20 K and preferably at least 50 K above the nucleation temperature, a temperature range of ±50 K around the peak maximum (in range 2 marked in FIG. 1) being desirable. The glass ceramic was left at this temperature until the precipitated crystallites had attained a sufficient size.

The material was then heated to another higher temperature, usually from the temperature intervals 3 and 4. The glass ceramic was kept at this temperature to enable the crystallization of the tertiary crystal phases with sufficient crystallite size.

The holding times at the particular temperatures to form the primary, secondary or tertiary crystalline phases depend on the growth velocity of these phases and usually amount to at least 15 minutes and preferably at least 30 minutes, a holding time between 60 and 180 minutes and particularly between 90 and 120 minutes being particularly preferred. The upper limit of the holding times is usually a maximum of 60 hours and preferably a maximum of 12 hours. In many cases it is also possible, after the formation and ripening of the primary crystal phases or nuclei, to heat the material to a single higher temperature, for example within temperature range 4 of FIG. 1, to cause at this temperature the simultaneous crystallization or recrystallization of secondary and tertiary crystal phases.

According to the invention, during the ceramization of the starting glass, the heating to a temperature just below the Tg is carried out relatively rapidly, namely at 5-15 K min$^{-1}$ and particularly at about 10 K min$^{-1}$. The heating to the temperature that brings about the precipitation of primary crystal phases or nuclei is then carried out more slowly, at about 3-8 K min$^{-1}$ and usually at about 5 K min$^{-1}$. In many cases, the heating rate can also amount to 0.5-3 K min$^{-1}$. The higher temperatures at which secondary or tertiary crystal phases crystallize can be attained at very different heating rates in the range of 0.5-200 K min$^{-1}$. The selection of these heating rates depends on the growth rates of the particular crystal phases in the matrix material in question.

The glasses indicated hereinbelow were prepared as follows.

In a Pt/Rh crucible at 1600-1700° C., charges of 100 g to 3 kg of a particular glass lot were melted and cast to form plates (thickness: 0.5-3 cm ). These glass plates were annealed at a temperature of Tg+20 K and then slowly cooled to room temperature.

To prepare the glass ceramics, the glasses were heat-treated by the afore-described procedure, as indicated in the following table. This caused precipitation of the crystallites of the various crystal phases. The crystallization was carried out by use of a one-step or multistep cooling program. To this end, the indication of, for example, 800° C./2 h, 950° C./1 h, 1050° C./1 h, means that the glass was subjected to a heat treatment at 800° C. for 2 hours, then at 950° C. for 1 hour and finally at 1050° C. for 1 hour. Spinel was found to form as the first crystalline phase, its formation taking place in the temperature range of about 750-900° C. after 1-2 hours. The crystal growth of the spinel or the precipitation of sapphirine or of other crystal phases was achieved in about 2 hours in a second step of the heat treatment between 850° C. and 1050° C. In some cases, crystal growth was also brought about by extending the holding time at a temperature around 900° C. In the table, Sp stands for spinel, Sa for sapphirine, Co for cordierite, Ps for yttrium pyrosilicate, Pc for yttrium pyrochlore, Xe for yttrium phosphate (xenotime) and Ru for rutile (TiO$_2$).

The glasses and glass ceramics prepared were comprehensively characterized. The modulus of elasticity and the flexural strength were determined from flexural tests, the Klc value was calculated by measuring the radial crack lengths by the VICKERS method. The density was determined by the buoyancy method and the ther-mal expansion coefficient by dilatometric measurements. The analysis of the crystal phases was performed by x-ray diffractometry. Crystal structures and texture were derived from scanning electron micrographs. To this end, after standard polishing, scanning force microscopic studies (AFM) were carried out to obtain a surface topography. An averaging of the measured data gave the indicated values of the surface roughness. In this regard, Ra means the arithmetic mean and rq (or rms) the geometric mean of the measured data. PV indicates the distance from peak to valley of the maxima/minima along a measured section.

| | Practical Examples P 1853 | | |
|---|---|---|---|
| | 1 Wt. % | 2 Wt. % | 3 Wt. % |
| SiO$_2$ | 32.72 | 23.88 | 22.89 |
| B$_2$O$_3$ | 3.79 | 8.29 | 3.97 |
| P$_2$O$_5$ | 0.10 | 0.10 | 8.10 |
| Al$_2$O$_3$ | 37.02 | 30.38 | 29.12 |
| TiO$_2$ | 2.90 | 5.57 | 5.34 |
| Y$_2$O$_3$ | 8.20 | 11.20 | 10.74 |
| MgO | 15.37 | 12.81 | 12.28 |
| CaO | | 2.78 | 2.67 |
| SrO | | 2.06 | 1.97 |
| BaO | | 3.04 | 2.92 |

| Crystallization Program | Modulus of Elasticity (GPa) | Crystal Phases | Crystallization Program | Modulus of Elasticity (GPa) | Crystal Phases | Crystallization Program | Modulus of Elasticity (GPa) | Crystal Phases |
|---|---|---|---|---|---|---|---|---|
| glassy | 90 ± 6 | — | glassy | 117 ± 4 | — | glassy | 109 ± 3 | — |
| 850° C./2 h | 134 ± 4 | Sp/Sa | 760° C./2 h 930° C./0.5 h | 116 ± 18 | Sa/Ps | 800° C./2 h 900° C./1 h | 125 ± 10 | Sp/Sa |

-continued

Practical Examples P 1853

| | | | | | | | | |
|---|---|---|---|---|---|---|---|---|
| 850° C./1 h | 147 ± 4 | Sp(?)/Sa/(Co?) | 760° C./4 h | 124 ± 9 | Sa/Ps/Pc | 760° C./4 h | 122 ± 9 | Sp/Sa/Xe |
| 950° C./1 h | | | 1040° C./1 h | | | 960° C./0.5 h | | |
| 800° C./1 h | | Sa/Co/Ps/Pc | | | | 760° C./4 h | 127 ± 7 | Sp/Sa/Xe/Ru |
| 950° C./1 h | | | | | | 1040° C./1 h | | |
| 1050° C./1 h | | | | | | | | |
| 1050° C./1 h | | Sa/Co/Pc | | | | | | |
| 1150° C./1 h | | | | | | | | |

| | 4 Wt. % | 5 Wt. % | 6 Wt. % |
|---|---|---|---|
| $SiO_2$ | 22.47 | 21.37 | 23.26 |
| $B_2O_3$ | 3.47 | 1.77 | 1.80 |
| $P_2O_5$ | 7.08 | 5.41 | 7.93 |
| $Al_2O_3$ | 33.05 | 33.67 | 34.20 |
| $TiO_2$ | 3.98 | 10.14 | 6.24 |
| $Y_2O_3$ | 16.69 | 14.34 | 11.65 |
| MgO | 13.06 | 13.31 | 13.52 |
| CaO | | | |
| SrO | | | |
| BaO | | | |

| Crystallization Program | Crystal Phases | Crystallization Program | Modulus of Elasticity | Crystal Phases | Crystallization Program | Modulus of Elasticity (GPa) | Crystal Phases |
|---|---|---|---|---|---|---|---|
| glassy | — | glassy | 146 ± 4 | (Sp) | glassy | | — |
| 1000° C./1 h | Sa/Co/Xe | | | | 800° C./12 h | 125 | (Sp?)/Sa |
| | | | | | 600° C./60 h | 158 | Sa |
| | | | | | 760° C./4 h | | |
| | | | | | 1040° C./1 h | | Sa/Xe/Pc/Ru |

| | 7 Wt. % | 8 Wt. % |
|---|---|---|
| $SiO_2$ | 21.23 | 22.70 |
| $B_2O_3$ | 0.00 | 1.77 |
| $P_2O_5$ | 10.03 | 7.20 |
| $Al_2O_3$ | 26.41 | 31.70 |
| $TiO_2$ | 9.41 | 8.11 |
| $Y_2O_3$ | 18.61 | 14.00 |
| MgO | 9.97 | 13.10 |
| CaO | 1.32 | 1.42 |
| SrO | 1.22 | |
| BaO | 1.81 | |

| Crystallization Program | Modulus of Elasticity (GPa) | Crystal Phases | Crystallization Program | Modulus of Elasticity (GPa) | Crystal Phases |
|---|---|---|---|---|---|
| glassy | | — | glassy | 135 | — |
| 800° C./12 h | 125 | (Sp?)/Sa | 800° C./12 h | 137 | Sp/Sa |
| 800° C./60 h | 134 | Sa | 800° C./48 h | 148 | Sp/Sa |
| 760° C./4 h | | Sa/Xe/Pc/Ru | 800° C./12 h | 180 | Sa/Xe/Pc/Ru |
| 1040° C./1 h | | | 1040° C./1 h | | |

Abbr.: Sp: spinel; Sa: sapphirine; Co: cordierite; Pa: yttrium pyrosilicate; Pc: yttrium pyrochlore; Xe: yttrium phosphate (xenotime); Ru: rutile ($TiO_2$)
( ): phase of secondary importance
?: phase not clearly identified

The invention claimed is:

1. A crystallizable magnesium-containing aluminosilicate glass for making a highly rigid, break-resistant glass ceramic, said magnesium-containing aluminosilicate glass having a composition in percent by weight, based on oxide content, comprising:
   $SiO_2$ 5 to 33
   $Al_2O_3$ 25 to 40
   MgO 5 to 25
   $B_2O_3$ 0 to 9
   $P_2O_5$ 0.1 to 10, and
   at least one of $Y_2O_3$, $Ln_2O_3$, $As_2O_3$, and $Nb_2O_5$,
   in which each of said $Y_2O_3$, said $Ln_2O_3$, said $As_2O_3$, and said $Nb_2O_5$ that is present in the glass is present in an amount of at least 0.1 percent by weight but no more than 30 percent by weight.

2. The crystallizable magnesium-containing aluminosilicate glass as defined in claim 1, containing from 10 to 30 percent by weight of said $Y_2O_3$ and from 0 to 20 percent by weight of said $Ln_2O_3$.

3. The crystallizable magnesium-containing aluminosilicate glass as defined in claim 1, containing from 2 to 12 percent by weight of $TiO_2$, from 1 to 10 percent by weight of $ZrO_2$, and/or from 1 to 20 percent by weight of ZnO.

4. The crystallizable magnesium-containing aluminosilicate glass as defined in claim 3, containing from 2 to 10 percent by weight of said $TiO_2$.

5. The crystallizable magnesium-containing aluminosilicate glass as defined in claim 1, containing at most 2 percent by weight of alkali metal oxides.

6. The crystallizable magnesium-containing aluminosilicate glass as defined in claim 1, containing from 0 to 5 percent by weight of CaO, from 0 to 5 percent by weight of SrO, and/or from 0 to 5 percent by weight of BaO.

7. The crystallizable magnesium-containing aluminosilicate glass as defined in claim 1, containing at most 10 percent by weight of at least one transition metal oxide.

8. The crystallizable magnesium-containing aluminosilicate glass as defined in claim 7, in which said at least one transition metal oxide is selected from the group consisting of $MnO_2$, $Fe_2O_3$, NiO, CoO, $Cr_2O_3$, $V_2O_5$, $MoO_3$ and $Wa_3$.

9. The crystallizable magnesium-containing aluminosilicate glass as defined in claim 1, which is made by a method comprising annealing at a temperature that is 5° C. to 50° C. above Tg for two minutes to one hour.

10. A glass ceramic having a modulus of elasticity of more than 110 Gpa and made by a method comprising heating a crystallizable magnesium-containing aluminosilicate glass above a Tg thereof, said crystallizable magnesium-containing aluminosilicate glass having a composition in percent by weight, based on oxide content, comprising:
$SiO_2$ 5 to 33
$Al_2O_3$ 25 to 40
MgO 5 to 25
$B_2O_3$ 0 to 9
$P_2O_5$ 0.1 to 10, and
at least one of $Y_2O_3$, $Ln_2O_3$, $As_2O_3$, and $Nb_2O_5$,
in which each of said $Y_2O_3$, said $Ln_2O_3$, said $As_2O_3$, and said $Nb_2O_5$ that is present in the glass is present in an amount of at least 0.1 percent by weight but no more than 30 percent by weight.

11. The glass ceramic as defined in claim 10, in which said crystallizable magnesium-containing aluminosilicate glass contains from 10 to 30 percent by weight of said $Y_2O_3$ and from 0 to 20 percent by weight of said $Ln_2O_3$.

12. The glass ceramic as defined in claim 10, in which said crystallizable magnesium-containing aluminosilicate glass contains from 2 to 12 percent by weight of $TiO_2$ and/or from 1 to 10 percent by weight of $ZrO_2$.

13. The glass ceramic as defined in claim 10, in which said crystallizable magnesium-containing aluminosilicate glass contains at most 2 percent by weight of alkali metal oxides.

14. The glass ceramic as defined in claim 10, in which said crystallizable magnesium-containing aluminosilicate glass contains from 0 to 5 percent by weight of CaO, from 0 to 5 percent by weight of SrO, and/or from 0 to 5 percent by weight of BaO.

15. The glass ceramic as defined in claim 10, in which said crystallizable magnesium-containing aluminosilicate glass contains less than 5 percent by weight of at least one transition metal oxide selected from the group consisting of $MnO_2$, $Fe_2O_3$, NiO, CoO, $Cr_2O_3$, $V_2O_5$, $MoO_3$ and $WO_3$.

16. The glass ceramic as defined in claim 10, having a thermal expansion coefficient ($\alpha_{20-600}$) of 4 to $9\times10^{-6}$ $K^{-1}$, a flexural strength of greater than 150 MPa, a surface roughness Ra of less than 0.5 nm, and a Klc of 1.3 M $Pam^{1/2}$.

17. A method of making a glass ceramic, said method comprising the steps of:
a) providing a crystallizable magnesium-containing aluminosilicate glass with a composition in percent by weight, based on oxide content, comprising:
$SiO_2$ 5 to 33
$Al_2O_3$ 25 to 40
MgO 5 to 25
$B_2O_3$ 0 to 9
$P_2O_5$ 0.1 to 10, and
at least one of $Y_2O_3$, $Ln_2O_3$, $As_2O_3$, and $Nb_2O_5$,
in which each of said $Y_2O_3$, said $Ln_2O_3$, said $As_2O_3$ and said $Nb_2O_5$ that is present in the glass is present in an amount of at least 0.1 percent by weight but no more than 30 percent by weight;
b) heating said crystallizable magnesium-containing aluminosilicate glass to a first nucleation temperature within a first temperature interval above Tg of said crystallizable magnesium-containing aluminosilicate glass in order to form primary crystallites or a primary crystalline phase of spinel and sapphirine;
c) after a holding time of at least 30 minutes in which the heating of step b) takes place, heating to a main crystallization temperature within a second temperature interval above the first temperature interval in order to precipitate and grow secondary crystalline phases of sapphirine and cordierite and then optionally heating to another higher temperature to precipitate and grow other crystalline phases of the xenotime, yttrium pyrosilicate, yttropyrochlore and/or rutile class; and
d) heating the glass in accordance with holding curves determined by differential thermal analysis until the crystalline phases have precipitated;
whereby a glass ceramic with a high modulus of elasticity greater than 110 GPa, a thermal expansion coefficient ($\alpha_{20-600}$) of 4 to $9\times10^{-6}$ $K^{-1}$, a flexural strength of greater than 150 MPa, a surface roughness Ra of less than 0.5 nm, and a Klc of 1.3 M $Pam^{1/2}$ is formed.

18. The method as defined in claim 17, in which said crystallizable magnesium-containing aluminosilicate glass contains from 10 to 30 percent by weight of said $Y_2O_3$ and from 0 to 20 percent by weight of said $Ln_2O_3$.

19. The method as defined in claim 17, in which said crystallizable magnesium-containing aluminosilicate glass contains from 2 to 12 percent by weight of $TiO_2$, from 1 to 10 percent by weight of $ZrO_2$, and/or from 0 to 20 percent by weight of ZnO.

20. The method as defined in claim 17, in which said crystallizable magnesium-containing aluminosilicate glass contains from 0 to 5 percent by weight of CaO, from 0 to 5 percent by weight of SrO, and/or from 0 to 5 percent by weight of BaO.

21. The method as defined in claim 17, in which said crystallizable magnesium-containing aluminosilicate glass contains at most 2 percent by weight of alkali metal oxides.

22. The method as defined in claim 17, in which said crystallizable magnesium-containing aluminosilicate glass contains less than 5 percent by weight of at least one transition metal oxide selected from the group consisting of $MnO_2$, $Fe_2O_3$, NiO, CoO, $Cr_2O_3$, $V_2O_5$, $MoO_3$ and $WO_3$.

23. A magnetic storage disk comprising the glass ceramic as defined in claim 10.

24. A magneto-optical storage device comprising the glass ceramic as defined in claim 10.

25. A mirror carrier comprising the glass ceramic as defined in claim 10.

* * * * *